US012785996B1

(12) United States Patent
Fung

(10) Patent No.: US 12,785,996 B1
(45) Date of Patent: Nov. 3, 2026

(54) COMPATABILITY BETWEEN ENERGY EFFICIENT PROTOCOLS

(71) Applicant: Marvell Asia Pte Ltd, Singapore (SG)

(72) Inventor: Hon Wai Fung, Newark, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 63 days.

(21) Appl. No.: 19/054,019

(22) Filed: Feb. 14, 2025

Related U.S. Application Data

(60) Provisional application No. 63/553,897, filed on Feb. 15, 2024.

(51) Int. Cl.
*H04L 12/12* (2006.01)

(52) U.S. Cl.
CPC .................................... *H04L 12/12* (2013.01)

(58) Field of Classification Search
CPC ...................................................... H04L 12/12
See application file for complete search history.

(56) References Cited

U.S. PATENT DOCUMENTS

2015/0212562 A1* 7/2015 Guichard ................ H04L 12/12 713/310
2015/0261282 A1* 9/2015 Yamauchi ............. G06F 1/3206 713/320
2018/0159999 A1* 6/2018 Ito ......................... G06F 3/1229
2024/0283676 A1* 8/2024 Go .......................... H04L 12/12
2025/0274209 A1* 8/2025 Jonsson ................ H04J 3/0608
2025/0293900 A1* 9/2025 Kotani .............. H04L 12/40039

* cited by examiner

*Primary Examiner* — Hyun Soo Kim

(57) ABSTRACT

A method, performed by a microcontroller unit, for managing power consumption of a physical layer transceiver includes receiving a state change instruction indicative of an intent to change the physical layer transceiver from operating under a first energy-saving protocol to operating under a second energy-saving protocol. The method further includes determining whether the first energy-saving protocol is an Energy-Efficient Ethernet protocol or a Technical Committee 10 protocol, and, based on the state change instruction and on determining whether the first energy-saving protocol is the Energy-Efficient Ethernet protocol or the Technical Committee 10 protocol, causing the physical layer transceiver to switch from operating under the first energy-saving protocol to operating under a normal protocol. The method further includes causing the physical layer transceiver to switch from operating under the normal protocol to operating under the second energy-saving protocol.

20 Claims, 4 Drawing Sheets

COMPATABILITY BETWEEN ENERGY EFFICIENT PROTOCOLS

CROSS REFERENCE TO RELATED APPLICATION

This disclosure claims the benefit of copending, commonly-assigned U.S. Provisional Patent Application No. 63/553,897, filed Feb. 15, 2024, which is hereby incorporated by reference herein in its entirety.

FIELD OF USE

This disclosure relates to operating a physical layer transceiver according to energy-saving protocols. More particularly, this disclosure relates to compatibly switching a physical layer transceiver from operating under the Energy-Efficient Ethernet protocol to operating under the Technical Committee 10 protocol, or vice-versa.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Various energy saving protocols exist for efficiently operating Ethernet physical layer transceivers of electronic devices. Among those protocols are the Energy-Efficient Ethernet (EEE) protocol, defined by the Institute of Electrical and Electronics Engineers 802.3az standard, which may be implemented to allow a device's physical layer transceiver to enter a low-power idle state and to thereby reduce the device's overall power consumption, and the Technical Committee 10 (TC10) protocol, defined by the Open Alliance specification, which may be implemented in automotive Ethernet applications where strict timing requirements are required to facilitate precise operations. The TC10 protocol allows a device's physical layer transceiver to operate under specific sleep and wake protocols to reduce the device's overall power consumption. When a PHY operates under either the EEE or TC10 protocol, certain functionalities may be limited as a tradeoff for reduced power consumption. It may be more favorable for a PHY to operate under one of the two protocols depending on the given use case.

SUMMARY

In accordance with implementations of the subject matter of this disclosure, a method, performed by a microcontroller unit, for managing power consumption of a physical layer transceiver includes receiving a state change instruction indicative of an intent to change the physical layer transceiver from operating under a first energy-saving protocol to operating under a second energy-saving protocol. The first energy-saving protocol is one of an Energy-Efficient Ethernet protocol or a Technical Committee 10 protocol, and the second energy-saving protocol is the other one of the Energy-Efficient Ethernet protocol or the Technical Committee 10 protocol. The method further includes determining whether the first energy-saving protocol is the Energy-Efficient Ethernet protocol or the Technical Committee 10 protocol, and, based on the state change instruction and on determining whether the first energy-saving protocol is the Energy-Efficient Ethernet protocol or the Technical Committee 10 protocol, causing the physical layer transceiver to switch from operating under the first energy-saving protocol to operating under a normal protocol. The method further includes causing the physical layer transceiver to switch from operating under the normal protocol to operating under the second energy-saving protocol.

In a first implementation of such a method, the first energy-saving protocol is the Energy-Efficient Ethernet protocol, and the state change instruction includes a low-power sleep instruction that indicates an intent to switch operation into the Technical Committee 10 protocol.

In a second implementation of such a method, the first energy-saving protocol is the Energy-Efficient Ethernet protocol, and the state change instruction includes a wake-up request instruction that indicates an intent to switch operation into the Technical Committee 10 protocol.

In a third implementation of such a method, the first energy-saving protocol is the Technical Committee 10 protocol, and the state change instruction includes a low-power idle instruction that indicates an intent to switch operation into the Energy-Efficient Ethernet protocol.

In a fourth implementation of such a method, the first energy-saving protocol is the Energy-Efficient Ethernet protocol, and causing the physical layer transceiver to switch from operating under the first energy-saving protocol to operating under the normal protocol further includes delaying execution of a state change signaled by the state change instruction until the physical layer transceiver is operating under the normal protocol.

A fifth implementation of such a method may further include determining that the state change instruction is no longer valid and, based on the state change instruction no longer being valid, causing the physical layer transceiver to return to operating under the first energy-saving protocol.

A sixth implementation of such a method may further include transmitting a sleep handshake to another physical layer transceiver from which the state change instruction was received.

In a seventh implementation of such a method, the first energy-saving protocol is the Energy-Efficient Ethernet protocol, and causing the physical layer transceiver to switch from operating under the first energy-saving protocol to operating under the normal protocol further includes causing the physical layer transceiver to cease transmitting a low-power idle instruction.

In accordance with implementations of the subject matter of this disclosure, a microcontroller unit for managing power consumption of a physical layer transceiver, is configured to receive a state change instruction indicative of an intent to change the physical layer transceiver from operating under a first energy-saving protocol to operating under a second energy-saving protocol. The first energy-saving protocol is one of an Energy-Efficient Ethernet protocol or a Technical Committee 10 protocol, and the second energy-saving protocol is the other one of the Energy-Efficient Ethernet protocol or the Technical Committee 10 protocol. The microcontroller unit is further configured to determine whether the first energy-saving protocol is the Energy-Efficient Ethernet protocol or the Technical Committee 10 protocol, and, based on the state change instruction and on the determination of whether the first energy-saving protocol is the Energy-Efficient Ethernet protocol or the Technical Committee 10 protocol, cause the physical layer transceiver to switch from operating under the first energy-saving protocol to operating under a normal protocol. The microcontroller unit is further configured to cause the physical layer transceiver to switch from operating under the normal protocol to operating under the second energy-saving protocol.

In a first implementation of such a microcontroller unit, the first energy-saving protocol is the Energy-Efficient Ethernet protocol, and the state change instruction includes a low-power sleep instruction that indicates an intent to switch operation into the Technical Committee 10 protocol.

In a second implementation of such a microcontroller unit, the first energy-saving protocol is the Energy-Efficient Ethernet protocol, and the state change instruction includes a wake-up request instruction that indicates an intent to switch operation into the Technical Committee 10 protocol.

In a third implementation of such a microcontroller unit, the first energy-saving protocol is the Technical Committee 10 protocol, and the state change instruction includes a low-power idle instruction that indicates an intent to switch operation into the Energy-Efficient Ethernet protocol.

In a fourth implementation of such a microcontroller unit, the first energy-saving protocol is the Energy-Efficient Ethernet protocol, and the microcontroller unit is further configured to, when causing the physical layer transceiver to switch from operating under the first energy-saving protocol to operating under the normal protocol, delay execution of a state change signaled by the state change instruction until the physical layer transceiver is operating under the normal protocol.

A fifth implementation of such a microcontroller may be further configured to determine that the state change instruction is no longer valid and based on the state change instruction no longer being valid, cause the physical layer transceiver to return to operating under the first energy-saving protocol.

A sixth implementation of such a microcontroller unit may be further configured to transmit a sleep handshake to another physical layer transceiver from which the state change instruction was received.

In a seventh implementation of such a microcontroller unit, the first energy-saving protocol is the Energy-Efficient Ethernet protocol, and the microcontroller unit is further configured to, when causing the physical layer transceiver to switch from operating under the first energy-saving protocol to operating under the normal protocol, cause the physical layer transceiver to cease transmitting a low-power idle instruction.

In accordance with implementations of the subject matter of this disclosure, a system including a first physical layer transceiver and a second physical layer transceiver such that the first physical layer transceiver and the second physical layer transceiver are communicatively coupled as link partners, and the second physical layer transceiver includes a microcontroller unit configured to receive, from the first physical layer transceiver, a state change instruction indicative of an intent to change the second physical layer transceiver from operating under a first energy-saving protocol to operating under a second energy-saving protocol. The first energy-saving protocol is one of an Energy-Efficient Ethernet protocol or a Technical Committee 10 protocol, and the second energy-saving protocol is the other one of the Energy-Efficient Ethernet protocol or the Technical Committee 10 protocol. The microcontroller unit of the system is further configured to determine whether the first energy-saving protocol is the Energy-Efficient Ethernet protocol or the Technical Committee 10 protocol, and based on the state change instruction and on the determination of whether the first energy-saving protocol is the Energy-Efficient Ethernet protocol or the Technical Committee 10 protocol cause the second physical layer transceiver to switch from operating under the first energy-saving protocol to operating under a normal protocol. The microcontroller unit of the system is further configured to cause the second physical layer transceiver to switch from operating under the normal protocol to operating under the second energy-saving protocol.

In a first implementation of such a system, the first energy-saving protocol is the Energy-Efficient Ethernet protocol, and the state change instruction includes a low-power sleep instruction that indicates an intent to switch operation into the Technical Committee 10 protocol. In a second implementation of such a system, the first energy-saving protocol is the Energy-Efficient Ethernet protocol, and the state change instruction comprises a wake-up request instruction that indicates an intent to switch operation into the Technical Committee 10 protocol.

In a third implementation of such a system, the first energy-saving protocol is the Technical Committee 10 protocol, and the state change instruction includes a low-power idle instruction that indicates an intent to switch operation into the Energy-Efficient Ethernet protocol.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
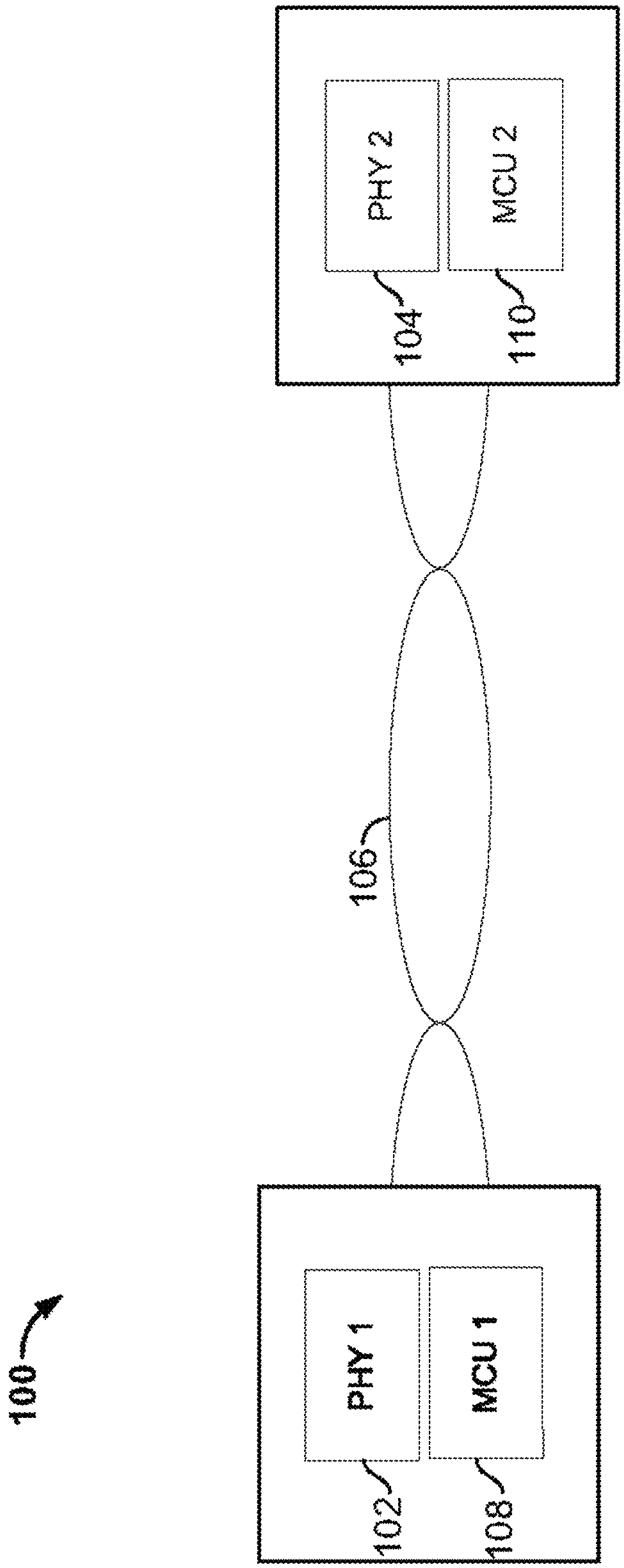
FIG. 1 is a diagram illustrating two PHYs that are communicatively coupled via an Ethernet connection and are configurable for low-power operation, in accordance with implementations of the subject matter of this disclosure.

Energy-saving protocols are used to keep one or more physical layer transceivers (PHYs) of an electronic device operational while reducing (or minimizing) power consumption of the PHYs. As mentioned above, two protocols for managing power consumption while maintaining a certain degree of device functionality (e.g., maintaining communication over an Ethernet connection) are the Energy-Efficient Ethernet (EEE) protocol and the Technical Committee 10 (TC10) protocol. The EEE protocol may be implemented to reduce power consumption for PHYs within an Ethernet network by limiting the types of data signals that those PHYs may transmit or receive. The EEE protocol is broadly applicable to situations in which low power operation is desirable. Compared to the EEE protocol, the TC10 protocol may be implemented to more significantly reduce the power consumption of a PHY while maintaining operation according to strict timing requirements. The TC10 protocol is applicable, e.g., to automotive Ethernet applications where both low power and low-latency operations are desirable.

If a PHY is not operating under an energy-saving protocol, then the PHY may operate under a protocol that is not specifically designed to affect power consumption (hereafter referred to as a "normal protocol" in this description and the claims which follow). A PHY operating under a normal protocol may transmit and receive a full spectrum of possible data traffic to and from one or more other PHYs over an Ethernet connection (i.e., without operational restrictions for the sake of reduced power consumption). For example, a PHY operating under a normal protocol may continuously transmit and receive any type of data, e.g., raw bit streams of data, to serve a given task. In contrast, a PHY operating under an energy-saving protocol (e.g., the EEE protocol or the TC10 protocol), may only transmit and receive a narrow spectrum of possible data traffic compared to if the PHY operates under a normal protocol as further described below.

When a PHY is operating under the EEE protocol, the PHY enters a low-power idle (LPI) mode. When a PHY is operating under the LPI mode, the PHY enters a "sleep" state where power consumption is reduced. A PHY may also "wake" from LPI mode under certain timing conditions that are included under the EEE protocol. For example, when a PHY needs to "wake" from LPI mode, the PHY may transmit a "wake-up" signal and wait for some predetermined exit time-out period to elapse before transmitting normal data traffic. While operating under LPI mode, a PHY only transmits periodic sleep, refresh, and wake signals. That is, a PHY operating under LPI mode may not transmit regular data signals or otherwise receive regular data traffic. As a result, a PHY operating under the EEE protocol consumes less power but has less functionality compared to when that PHY operates under a normal power consumption protocol.

For automotive applications, the TC10 protocol provides greater reduction in power consumption compared to the EEE protocol. A PHY operating under the EEE protocol may have a power consumption level on the order of milliwatts whereas a PHY operating under the TC10 protocol may have a power consumption level on the order of microwatts. In particular, according to the Open Alliance specification, a PHY which is "sleeping" under the TC10 protocol may draw no more than 10 microamperes of current. A PHY operating under the TC10 protocol is able to consume such a small amount of power because the PHY abides by strict timing requirements with regards to sleeping and waking.

Because the EEE and TC10 protocols have respective features and tradeoffs, it may be desirable to compatibly switch between these protocols without incurring an error, and without incurring excess latency in view of a refresh rate of the active protocol. This may be referred to as "compatibly switching" in this description and the claims which follow. For example, PHYs of an infotainment system for an automobile may sleep under the EEE protocol while the ignition of the vehicle is on and while a driver is in the vehicle if the infotainment system is not currently being used. If the vehicle's ignition is off, but the driver is still in the vehicle, then it may instead be desirable for the PHYs of the infotainment system to sleep under the TC10 protocol. As a result of the ignition turning off while the driver is still in the vehicle, PHYs of the infotainment system may receive TC10-specific sleep signals while the PHYs are operating under the EEE protocol. However, sleep requests under the TC10 protocol assume that a PHY is operating under a normal protocol. As a result, if a PHY that is operating under the EEE protocol receives an instruction to switch to operating under the TC10 protocol, or vice versa, the different timing requirements specified by the two protocols may introduce excess latency, a failure to execute other concurrent functions, or even a failure to complete the transition between the protocols. These limitations reduce the degree of interoperability between the EEE protocol and the TC10 protocol.

Improved interoperability between the EEE protocol and the TC10 protocol can improve operational flexibility of a PHY while maximizing energy-saving efforts. As a result of improving the interoperability between the EEE protocol and the TC10 protocol, attempts to switch a PHY from operating under a first energy-saving protocol to operating under a different energy-saving protocol may occur without excess latency if the PHY that receives an instruction to switch from the first energy-saving protocol to the second energy-saving protocol first switches to a normal protocol before completing the instruction to switch to the second energy-saving protocol. EEE-specific and TC10-specific signals (e.g., sleep and wake signals) are different signals with similar functions (i.e., which limit functional capabilities reduce power consumption of a PHY of any suitable device). Because EEE-specific and TC10-specific signals (e.g., sleep and wake signals) are different, EEE-specific and TC10-specific signals abide by different timing rules (e.g., rules which specify how long a PHY may stay in a low power protocol before returning to a normal protocol). Beginning a protocol transition by entering a normal protocol prevents conflicts from occurring between the different timing requirements specified by the respective energy-saving protocols.

In accordance with implementations of the subject matter of this disclosure, a method for low-latency switching between two energy-saving protocols, namely the EEE protocol and the TC10 protocol, is provided. When a PHY receives a signal (e.g., including an instruction) to switch its mode of operation from one energy-saving protocol to a different energy-saving protocol, the PHY first switches from operating under the initial energy-saving protocol to operating under a normal protocol. Once the PHY is operating under the normal protocol, the PHY then switches to operating under the different energy-saving protocol specified by the instruction.

For example, while operating under the EEE protocol, in response to receiving a TC10-specific command (e.g., a TC10-specific sleep or wake command), a PHY first switches to operating under a normal protocol and then switches to operating under the TC10 protocol. Likewise, if a PHY is initially operating under the TC10 protocol, and the PHY receives an EEE-specific command (e.g., an LPI signal), then the PHY first switches from operating under the TC10 protocol to operating under a normal protocol. Once the PHY is operating under a normal protocol, then the PHY switches to operating under the EEE protocol.

The subject matter of this disclosure may be better understood by references to FIGS. 1-5.

FIG. 1 is an illustrative system 100 including two PHYs connected by communication link 106, in accordance with implementations of the subject matter of this disclosure. An instruction may be sent over communication link 106 that causes a PHY to switch its operating protocol (e.g., out of and/or into an energy-saving protocol). Communication link 106 may be a twisted pair cable or any other suitable transmission medium. First PHY 102 is communicatively coupled to second PHY 104 over communication link 106 (e.g., an Ethernet link, or any other suitable link). First PHY 102 and second PHY 104 are communicatively coupled over communication link 106 and thus may be referred to as link partners.

First PHY 102 may be coupled to first microcontroller unit (MCU) 108. Second PHY 104 may be coupled to second MCU 110. First MCU 108 and second MCU 110 may respectively configure first PHY 102 and second PHY 104 to operate under any suitable protocol, including causing the respective PHY to transition to operating under a protocol that is different from a current protocol. First PHY 102 and second PHY 104 may both operate under a particular energy-saving protocol, and the energy-saving protocol need not be the same for the two PHYS. For example, first PHY 102 may be operating under the TC10 protocol, and second PHY 104 may be operating under a normal protocol.

First PHY 102 may transmit certain signals to second PHY 104 which instruct second PHY 104 to switch from a current operating protocol to another operating protocol. For example, first PHY 104 may transmit an LPI signal to second PHY 104. An LPI signal may act as an instruction which causes a PHY which receives the signal to operate under an EEE-specific sleep mode.

Any suitable signal related to energy-saving protocols may also be transmitted over communication link 106. For example, second PHY 104 may successfully transition from operating under a non-TC10 protocol to operating under the TC10 protocol after receiving a corresponding instruction from first PHY 102. As a result of switching from operating under a non-TC10 protocol to operating under the TC10 protocol, second PHY 104 may transmit a sleep handshake signal over communication link 106 to first PHY 102. Suitable signals, other than low-power idle signals, related to energy-saving protocols may include TC10-specific wake-up request signals or TC10-specific low-power sleep signals.

Figure 2:
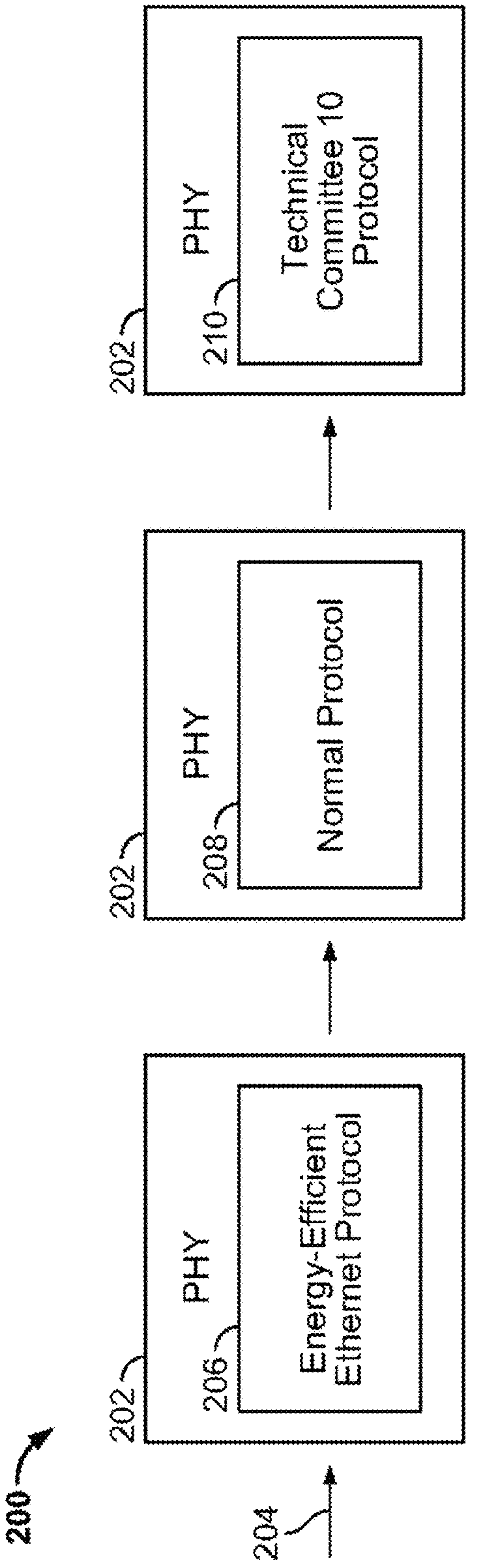
FIG. 2 is a state diagram illustrating a PHY switching from operating under the Energy-Efficient Ethernet protocol to operating under the Technical Committee 10 protocol, in accordance with implementations of the subject matter of this disclosure.
Figure 3:
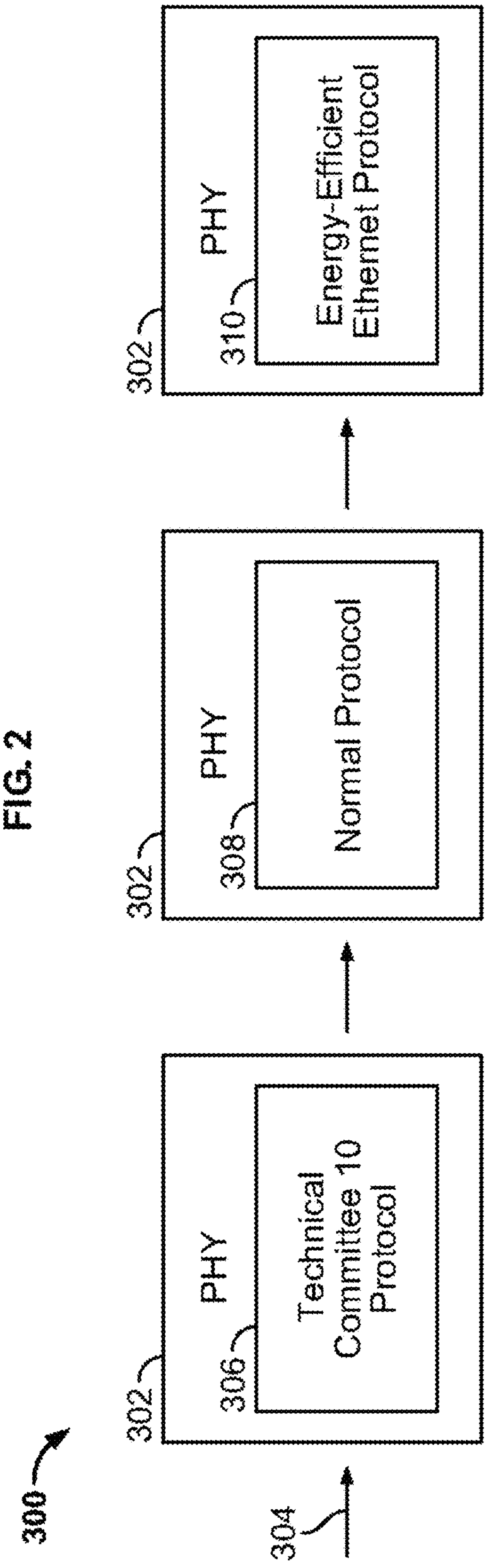
FIG. 3 is a state diagram illustrating a PHY switching from operating under the Technical Committee 10 protocol to operating under the Energy-Efficient Ethernet protocol, in accordance with implementations of the subject matter of this disclosure.
Figure 4:
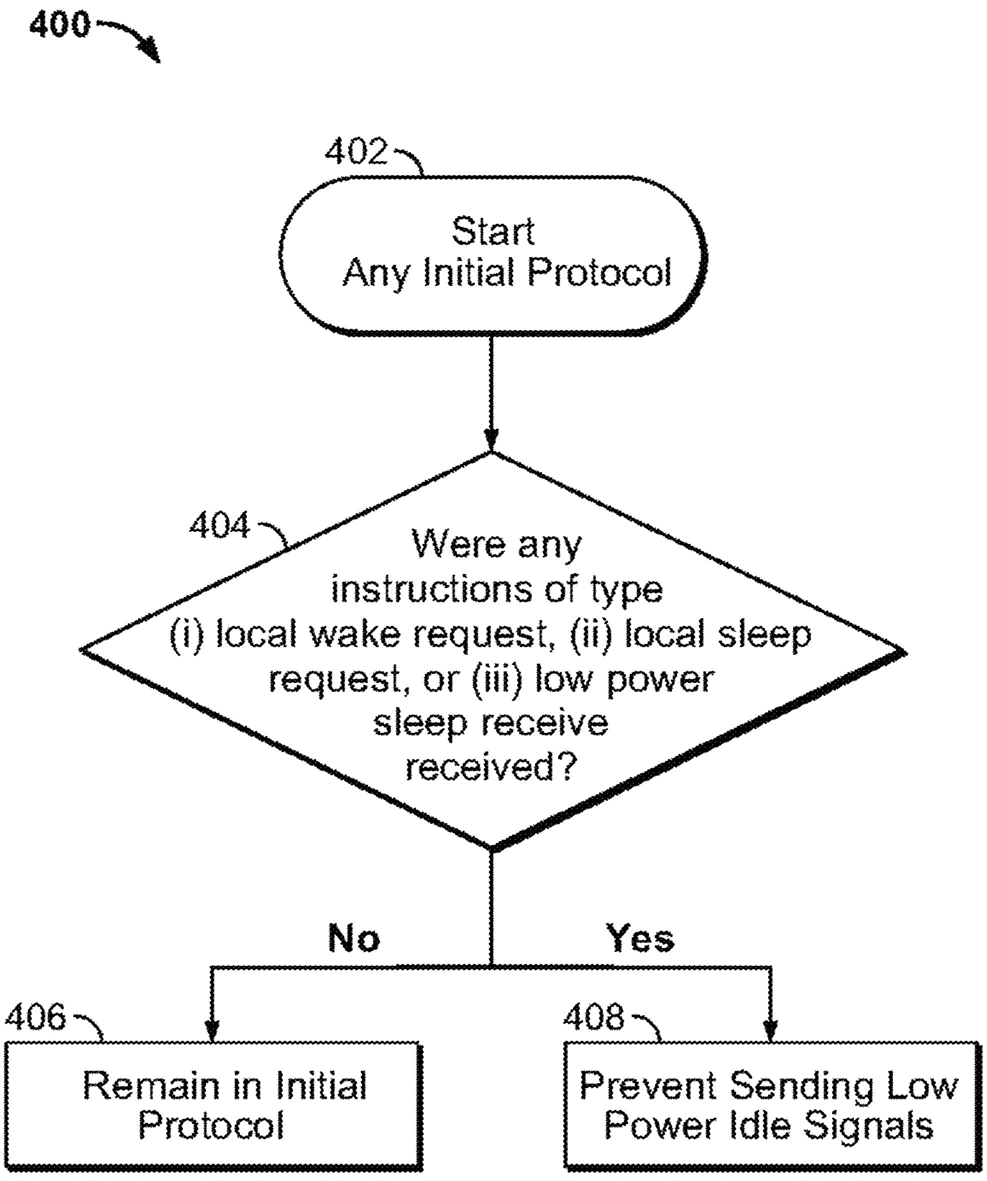
FIG. 4 is a flow diagram illustrating how a PHY operating under an energy-saving protocol may not transmit low power idle signals based on receiving a corresponding instruction, in accordance with implementations of the subject matter of this disclosure.
Figure 5:
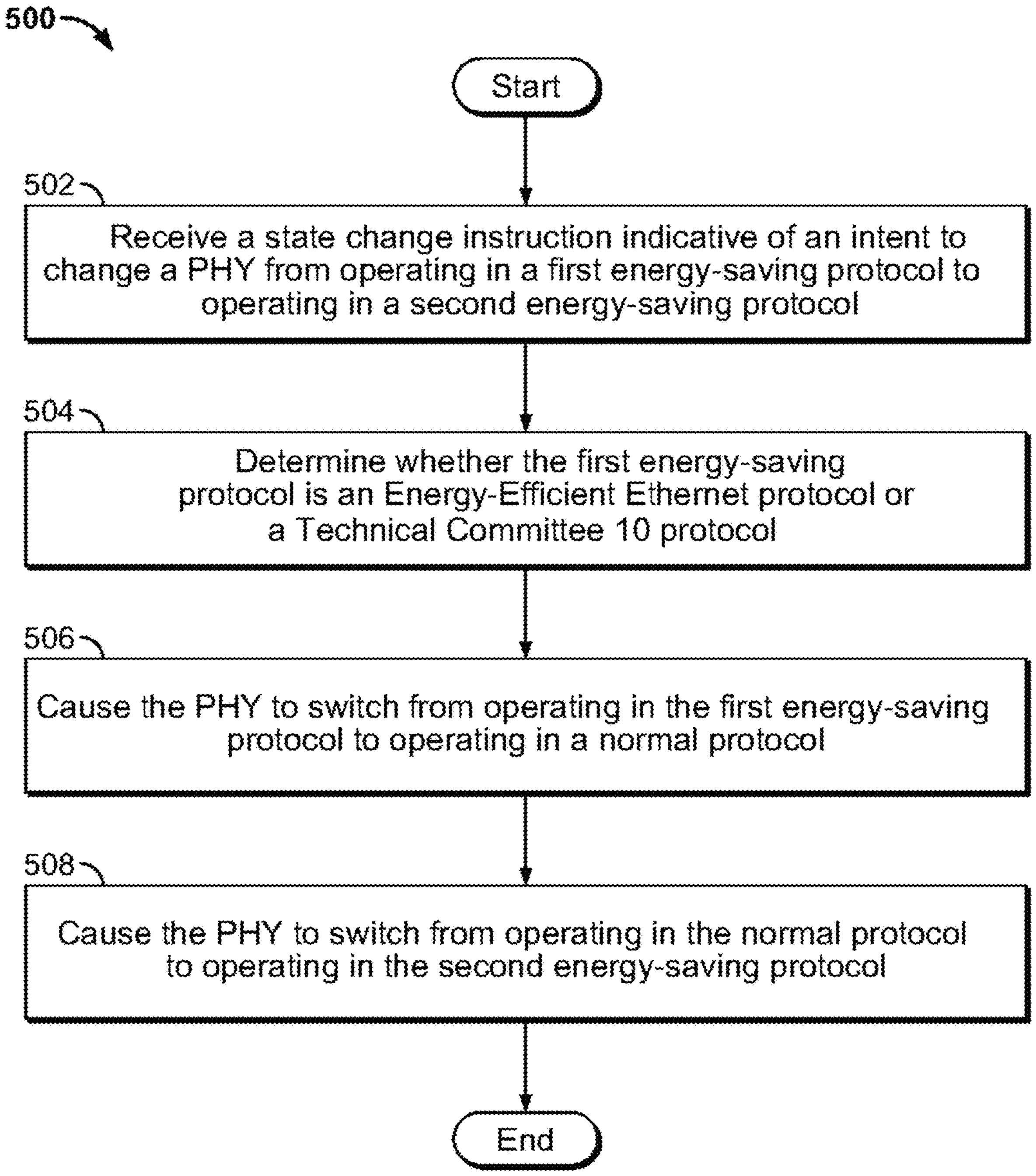
FIG. 5 is a flow diagram illustrating a method for switching an energy-saving protocol, in accordance with implementations of the subject matter of this disclosure.

In accordance with some implementations of the subject matter of this disclosure, system 100 may be used in connection with the scenarios of FIGS. 2 and 3, and either PHY of system 100 may execute the methods of FIGS. 4 and 5.

FIG. 2 is an illustrative state diagram 200, in which PHY 202 switches its operating protocol. State diagram 200 shows how PHY 202 (e.g., which may be any PHY shown in FIG. 1), while operating under EEE protocol 206, may receive state change instruction 204 requesting that PHY 202 switch to operating under TC10 protocol 210. Accordingly, PHY 202 transitions to operating under normal protocol 208, and then to operating under TC10 protocol 210, as further described below.

In some implementations, PHY 202 may receive state change instruction 204 as a low-power sleep (LPS) signal (e.g., from a link partner via communication link 106) while operating under EEE protocol 206. The LPS signal may be indicative of an intent to cause a PHY to operate under the TC10 protocol, e.g., to cause the PHY to "sleep" under TC10 timing and power consumption standards.

The received LPS signal may include any one or more of the following instructions: an instruction to transmit LPS signals, an instruction which is the opposite of a local wake request, an indication that a network connection between the given PHY and another PHY is active, an indication that more LPS signals may be received, or an instruction that LPI signals should not be transmitted.

As mentioned, the EEE and the TC10 protocols are not designed to operate together. Consequently, in the absence of modifications to the EEE protocol and TC10 protocol to introduce improved compatibility, as are provided in connection with implementations of the subject matter of this disclosure, PHY 202 may incur errors and/or excess latency when switching between the energy-saving protocols. To provide compatibility, as shown in FIG. 2, EEE protocol 206 may be modified. Based on the modification, PHY 202 may be configured to receive state change instruction 204 (e.g., an LPS signal) when operating under EEE protocol 206 to correspondingly transition to operating under TC10 protocol 210 after first switching to operating under normal protocol 208. After PHY 202 receives state change instruction 204, PHY 202 is prevented from transmitting LPI instructions. As a result, PHY 202 no longer operates under the EEE protocol timing rules (as further described below in connection with FIG. 3) in anticipation of (or concurrently with) switching to operating under normal protocol 208. From operation under normal protocol 208, PHY 202 may then be reconfigured to operate under TC10 protocol 210.

In some implementations, PHY 202 may initially be operating under EEE protocol 206 and may receive state change instruction 204 as a wake-up request (WUR) signal (e.g., from a link partner). The WUR signal may instruct PHY 202 to operate under the TC10 protocol, e.g., to cause PHY 202 to "wake" under TC10 timing and power consumption standards. PHY 202 may not operate under TC10 protocol 210 until it first operates under normal protocol 208.

A WUR signal received at a given PHY may include any one or more of the following instructions: an instruction to not transmit LPS signals, an instruction which is a local wake request, an indication that a network connection between the given PHY and a link partner is active, or an instruction that LPI signals should not be transmitted.

As may occur in response to receiving an LPS signal, in response to receiving a WUR signal while operating under EEE protocol 206, PHY 202 may be configured to transition to operating under TC10 protocol 210 by first operating under normal protocol 208. That is, in response to receiving the WUR signal, PHY 202 configures itself to operate under normal protocol 208, and then configures itself a second time to operate under TC10 protocol 210, as shown in FIG. 2. As a result of PHY 202 operating under a normal protocol and no longer operating under EEE protocol 206, PHY 202 may not transmit EEE-specific instructions (e.g., LPI signals). In some implementations, PHY 202 may act in response to receiving a WUR signal by transmitting and receiving normal data traffic for a period of time (e.g., the length of the period being defined by the TC10 protocol). After that period of time has passed, PHY 202 may operate under sleep timing requirements of TC10 protocol 210.

In some implementations, after PHY 202 switches from operating under EEE protocol 206 to operating under normal protocol 208, PHY 202 may receive another instruction (or make a determination) that state change instruction 204 was invalid (e.g., because state change instruction 204 has been canceled, has been overridden, or otherwise no longer applies). In response, PHY 202 switches back to operation under EEE protocol 206. If the transmission of state change instruction 204 is interrupted (e.g., the sending of an LPS signal or a WUR signal is ceased or otherwise rendered as invalid), then PHY 202 may be configured to stay in, or return to, operating under the state that it was in when the state change instruction 204 was received. For example, PHY 202 may initially operate under EEE protocol 206 and may receive an LPS signal. While PHY 202 is reconfiguring itself from operating under EEE protocol 206 to operating under normal protocol 208, PHY 202 may then receive an instruction which cancels the received LPS signal. Thus, PHY 202 may reconfigure itself to automatically return to operating under EEE protocol 206.

After PHY 202 receives state change instruction 204 and completes the switch from operating under EEE protocol 206 to operating under TC10 protocol 210, PHY 202 may transmit a sleep handshake (e.g., to the PHY from which the state instruction was received, to any other link partner, or to any combination thereof). For example, PHY 202 may transmit a sleep handshake (e.g., over communication link 106) to the link partner PHY which transmitted state change instruction 204.

As a reversal of the state transitions shown in FIG. 2, FIG. 3 is an illustrative state diagram of a PHY switching from operating under the TC10 protocol to operating under the EEE protocol, in accordance with implementations of the subject matter of this disclosure. Scenario 300 shows how PHY 302 (e.g., which may be any PHY shown in FIGS. 1 and 2), while operating under TC10 protocol 306, may receive state change instruction 304 indicative of an intent to switch from operating under a current protocol into EEE protocol 310. Accordingly, PHY 302 transitions from operating under normal protocol 308 and then to operating under TC10 protocol 310, as further described below.

PHY 302 may initially be operating under TC10 protocol 308. PHY 302 may receive state change instruction 304, e.g., an LPI signal, while operating under TC10 protocol 306. The LPI signal may cause PHY 302 to switch from operating under its current protocol to EEE protocol 310. Under EEE protocol 310, a given PHY may be configured such that only sleep and refresh (or otherwise wake and alert) signals may be transmitted or received.

PHY 302 may not operate under EEE protocol 310 from TC10 protocol 306 without first operating under normal protocol 308. If PHY 302 was initially operating under TC10 protocol 306, upon receiving state change instruction 304 (such that state change instruction 304 corresponds to an LPI signal), PHY 302 reconfigures itself and begins operating under normal protocol 308. Once PHY 302 is operating under normal protocol 308, PHY 302 is reconfigured again to begin operating under EEE protocol 310. As a further result of PHY 302 switching from operating under TC10 protocol 306 to operating under normal protocol 308, PHY 302 may no longer transmit TC10-specific instructions (e.g., LPS or WUR signals).

In some implementations, as in FIG. 2, PHY 302 may prevent itself from switching protocols if it determines that state change instruction 304 no longer applies, e.g., based on determining that state change instruction 304 should not be completed, ceases to be transmitted, or was overridden by a different state change instruction. PHY 302 may also transmit a sleep handshake to the PHY which transmitted state change instruction 304.

Receiving either a TC10 LPS signal or TC10 WUR signal prevents a PHY from operating under EEE protocol 310 and therefore also prevents a PHY from transmitting LPI signals. Other signals which are similar to LPS or WUR signals may cause a PHY operating under a given protocol to prevent sending LPI signals as an extra precaution against operating under EEE protocol 310 when a signal to operate under TC10 protocol 306 is received.

FIG. 4 is an illustrative flowchart of method 400 for preventing or ceasing transmission of LPI signals, in accordance with implementations of the subject matter of this disclosure. After a PHY receives one or more certain instructions indicative of an intent to cause a PHY to operate under the TC10 protocol, the PHY will not transmit LPI signals as further described below.

At 402, a PHY (e.g., which may be any PHY shown in FIGS. 1-3) is operating under a current protocol. The current protocol may be the EEE protocol, the TC10 protocol, a normal protocol, or any other type of protocol (e.g., that dictates power consumption and timing rules).

At 404, the PHY determines whether certain instructions (e.g., as provided in signals of type "local wake request," signals of type "local sleep request," signals of type "low power sleep received," or any combination thereof) corresponding to the TC10 protocol have been received. For example, a signal of type "local wake request" (i.e., a loc wake req signal) is an instruction that causes the PHY to operate under a wake mode under the TC10 protocol; a signal of type "local sleep request" (i.e., a loc sleep req signal) is an instruction that causes the PHY to operate under a sleep mode under the TC10 protocol; and a signal of type "local power sleep received" (i.e., a lps_recv signal) is an instruction which also causes the PHY to operate under a sleep mode under the TC10 protocol. At 404, the PHY may determine whether any one of the three signals instructing the PHY to operate under the TC10 protocol (e.g., signals of type "local wake request," signals of type "local sleep request," signals of type "low power sleep received," or any combination thereof) were received.

If at 404, the PHY determines that none of the three signals instructing the PHY to operate under the TC10 protocol were received, then at 406, the PHY continues its operations under the protocol which it was initially operating under during 402. For example, a PHY operating under the EEE protocol would continue to operate under the EEE protocol if a "local wake request," "local sleep request," or "low power sleep received" signal was not received.

If at 404, the PHY determines that at least one signal with instructions to operate under the TC10 protocol has been received, then at 408, the PHY is configured to not send any LPI signals to ensure that a link partner does not determine that the PHY is operating under the EEE protocol. In particular, if a PHY was originally operating under the EEE protocol and at least one signal with instructions to operate under the TC10 protocol was received, then PHY will cease to send any more LPI signals. Even if a PHY was originally operating under a normal protocol, then the operations at 408 further guarantee, by preventing the PHY from transmitting LPI signals, that the PHY does not operate under the EEE protocol.

Preventing a PHY from transmitting LPI signals may ensure that timing rules (e.g., exit time-out rules) do not conflict with other connected PHYs when the PHY is supposed to operate under the TC10 protocol. For example, if at 402 the PHY is already operating under the EEE protocol, then the PHY is prevented from transmitting TC10 LPS or WUR signals before the PHY switched out of the EEE protocol into the normal protocol on its way to switching to the TC10 protocol.

FIG. 5 is a flow diagram illustrating method 500 for switching a protocol, in accordance with implementations of the subject matter of this disclosure.

At 502, a PHY (e.g., which may be any PHY shown in FIGS. 1-3) receives a state change instruction indicative of an intent to change a device from operating under a first energy-saving protocol to operating under a second energy-saving protocol. For example, the state change instruction may be provided as, or included within, an EEE LPI, TC10 LPS, or TC10 WUR signal (as previously described in connection with FIGS. 2 and 3). The first energy-saving protocol is one of an EEE protocol or a TC10 protocol. The second energy-saving protocol is the other one of the EEE protocol or the TC10 protocol.

At 504, an MCU determines whether the first energy-saving protocol is the EEE protocol or the TC10 protocol. For example, second MCU 110 for second PHY 104 may determine that second PHY 104 is initially operating under the EEE protocol (e.g., if second PHY 104 is the same PHY as PHY 202).

At 506, based on the state change instruction and on determining whether the first energy-saving protocol is the Energy-Efficient Ethernet protocol or the Technical Committee 10 protocol, the PHY switches from operating under the first energy-saving protocol to operating under a normal protocol. For example, as described in connection with FIG. 2, a PHY may initially be operating under EEE protocol 206 and then switch to operating under normal protocol 208.

At 508, the PHY switches from operating under the normal protocol to operating under the second energy-saving protocol. For example, as described in FIG. 2, a PHY may switch from operating under normal protocol 208 to operating under TC10 protocol 210.

Thus it is seen that a method for low-latency switching between two energy-saving protocols has been provided.

As used herein, the characterizations of energy-saving and power-saving may be used interchangeably. In some implementations, operation under either of the protocols does not affect how long a given PHY is powered on or powered off, meaning that an energy-saving protocol corresponds to reduced power consumption, and a power-saving protocol correspond to reduced energy consumption.

As used herein and in the claims which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. A method, performed by a microcontroller unit, for managing power consumption of a physical layer transceiver, the method comprising:

receiving a state change instruction indicative of an intent to change the physical layer transceiver from operating under a first energy-saving protocol to operating under a second energy-saving protocol, wherein:

the first energy-saving protocol is one of an Energy-Efficient Ethernet protocol or a Technical Committee 10 protocol, and the second energy-saving protocol is the other one of the Energy-Efficient Ethernet protocol or the Technical Committee 10 protocol;

determining whether the first energy-saving protocol is the Energy-Efficient Ethernet protocol or the Technical Committee 10 protocol; and based on the state change instruction and on determining whether the first energy-saving protocol is the Energy-Efficient Ethernet protocol or the Technical Committee 10 protocol:

causing the physical layer transceiver to switch from operating under the first energy-saving protocol to operating under a normal protocol, and causing the physical layer transceiver to switch from operating under the normal protocol to operating under the second energy-saving protocol.

2. The method of claim 1, wherein:

the first energy-saving protocol is the Energy-Efficient Ethernet protocol; and the state change instruction comprises a low-power sleep instruction that indicates an intent to switch operation into the Technical Committee 10 protocol.

3. The method of claim 1, wherein:

the first energy-saving protocol is the Energy-Efficient Ethernet protocol; and the state change instruction comprises a wake-up request instruction that indicates an intent to switch operation into the Technical Committee 10 protocol.

4. The method of claim 1, wherein:

the first energy-saving protocol is the Technical Committee 10 protocol; and the state change instruction comprises a low-power idle instruction that indicates an intent to switch operation into the Energy-Efficient Ethernet protocol.

5. The method of claim 1, wherein:

the first energy-saving protocol is the Energy-Efficient Ethernet protocol; and causing the physical layer transceiver to switch from operating under the first energy-saving protocol to operating under the normal protocol further comprises delaying execution of a state change signaled by the state change instruction until the physical layer transceiver is operating under the normal protocol.

6. The method of claim 1, further comprising:

determining that the state change instruction is no longer valid; and based on the state change instruction no longer being valid, causing the physical layer transceiver to return to operating under the first energy-saving protocol.

7. The method of claim 1, further comprising transmitting a sleep handshake to another physical layer transceiver from which the state change instruction was received.

8. The method of claim 1, wherein:

the first energy-saving protocol is the Energy-Efficient Ethernet protocol; and causing the physical layer transceiver to switch from operating under the first energy-saving protocol to operating under the normal protocol further comprises causing the physical layer transceiver to cease transmitting a low-power idle instruction.

9. A microcontroller unit for managing power consumption of a physical layer transceiver, the microcontroller unit configured to:

receive a state change instruction indicative of an intent to change the physical layer transceiver from operating under a first energy-saving protocol to operating under a second energy-saving protocol, wherein:

the first energy-saving protocol is one of an Energy-Efficient Ethernet protocol or a Technical Committee protocol, and the second energy-saving protocol is the other one of the Energy-Efficient Ethernet protocol or the Technical Committee 10 protocol;

determine whether the first energy-saving protocol is the Energy-Efficient Ethernet protocol or the Technical Committee 10 protocol; and based on the state change instruction and on the determination of whether the first energy-saving protocol is the Energy-Efficient Ethernet protocol or the Technical Committee 10 protocol:

cause the physical layer transceiver to switch from operating under the first energy-saving protocol to operating under a normal protocol, and cause the physical layer transceiver to switch from operating under the normal protocol to operating under the second energy-saving protocol.

10. The microcontroller unit of claim 9, wherein:

the first energy-saving protocol is the Energy-Efficient Ethernet protocol; and the state change instruction comprises a low-power sleep instruction that indicates an intent to switch operation into the Technical Committee 10 protocol.

11. The microcontroller unit of claim 9, wherein:

the first energy-saving protocol is the Energy-Efficient Ethernet protocol; and the state change instruction comprises a wake-up request instruction that indicates an intent to switch operation into the Technical Committee 10 protocol.

12. The microcontroller unit of claim 9, wherein:

the first energy-saving protocol is the Technical Committee 10 protocol; and the state change instruction comprises a low-power idle instruction that indicates an intent to switch operation into the Energy-Efficient Ethernet protocol.

13. The microcontroller unit of claim 9, wherein:

the first energy-saving protocol is the Energy-Efficient Ethernet protocol; and the microcontroller unit is further configured to, when causing the physical layer transceiver to switch from operating under the first energy-saving protocol to operating under the normal protocol, delay execution of a state change signaled by the state change instruction until the physical layer transceiver is operating under the normal protocol.

14. The microcontroller unit of claim 9, further configured to:

determine that the state change instruction is no longer valid; and based on the state change instruction no longer being valid, cause the physical layer transceiver to return to operating under the first energy-saving protocol.

15. The microcontroller unit of claim 9, further configured to transmit a sleep handshake to another physical layer transceiver from which the state change instruction was received.

16. The microcontroller unit of claim 9, wherein:

the first energy-saving protocol is the Energy-Efficient Ethernet protocol; and the microcontroller unit is further configured to, when causing the physical layer transceiver to switch from operating under the first energy-saving protocol to operating under the normal protocol, cause the physical layer transceiver to cease transmitting a low-power idle instruction.

17. A system including a first physical layer transceiver and a second physical layer transceiver, the first physical layer transceiver and the second physical layer transceiver being communicatively coupled as link partners, the second physical layer transceiver comprising a microcontroller unit, the microcontroller unit configured to:

receive, from the first physical layer transceiver, a state change instruction indicative of an intent to change the second physical layer transceiver from operating under a first energy-saving protocol to operating under a second energy-saving protocol, wherein:

the first energy-saving protocol is one of an Energy-Efficient Ethernet protocol or a Technical Committee protocol, and the second energy-saving protocol is the other one of the Energy-Efficient Ethernet protocol or the Technical Committee 10 protocol;

determine whether the first energy-saving protocol is the Energy-Efficient Ethernet protocol or the Technical Committee 10 protocol; and based on the state change instruction and on the determination of whether the first energy-saving protocol is the Energy-Efficient Ethernet protocol or the Technical Committee 10 protocol:

cause the second physical layer transceiver to switch from operating under the first energy-saving protocol to operating under a normal protocol, and cause the second physical layer transceiver to switch from operating under the normal protocol to operating under the second energy-saving protocol.

18. The system of claim 17, wherein:

the first energy-saving protocol is the Energy-Efficient Ethernet protocol; and the state change instruction comprises a low-power sleep instruction that indicates an intent to switch operation into the Technical Committee 10 protocol.

19. The system of claim 17, wherein:

the first energy-saving protocol is the Energy-Efficient Ethernet protocol; and the state change instruction comprises a wake-up request instruction that indicates an intent to switch operation into the Technical Committee 10 protocol.

20. The system of claim 17, wherein:

the first energy-saving protocol is the Technical Committee 10 protocol; and the state change instruction comprises a low-power idle instruction that indicates an intent to switch operation into the Energy-Efficient Ethernet protocol.

* * * * *